United States Patent [19]
Korn et al.

[11] 3,966,311
[45] June 29, 1976

[54] METHOD OF PRODUCING PHOTOCHROMIC MULTIFOCAL SPECTACLE LENSES

[75] Inventors: Siegfried Korn, Oberkochen; Bernd Kratzer, Huttlingen; Otto Muckenhaupt, Oberkochen, all of Germany

[73] Assignee: Carl Zeiss-Stiftung, Oberkochen, Germany

[22] Filed: Jan. 22, 1975

[21] Appl. No.: 543,083

Related U.S. Application Data

[63] Continuation of Ser. No. 355,865, April 30, 1973, abandoned.

[30] Foreign Application Priority Data

May 2, 1972  Germany................ 2221488

[52] U.S. Cl................ 351/164; 351/177; 65/37; 65/38; 65/DIG. 2; 106/DIG 6; 106/52; 106/54
[51] Int. Cl.²............... G02B 1/10; C03B 11/08
[58] Field of Search............... 65/DIG. 2, 38, 37; 351/163, 164, 177; 106/DIG. 6, 52, 54

[56] References Cited
UNITED STATES PATENTS

| | | | |
|---|---|---|---|
| 2,177,021 | 10/1939 | Hammon | 65/38 X |
| 2,958,162 | 11/1960 | Upton | 65/38 X |
| 3,149,948 | 9/1964 | Seymour | 65/38 X |
| 3,703,660 | 11/1972 | Fyler | 65/DIG. 7 |
| 3,795,523 | 3/1974 | Moriya et al. | 65/DIG. 2 |
| 3,797,910 | 3/1974 | Westwigi | 350/96 B |
| 3,801,336 | 4/1974 | Upton | 65/38 X |
| 3,834,912 | 9/1974 | Gliemeroth | 65/DIG. 2 |

OTHER PUBLICATIONS

"Photogray Glass for Ophthalmic Lenses" Technical Bulletin — Published Optical Products Dept. Corning Glass Works — Corning, New York 14830, OPH 4-68 — Revised 7-70 — 9 pages.

*Primary Examiner*—S. Leon Bashore
*Assistant Examiner*—Frank W. Miga
*Attorney, Agent, or Firm*—Stonebraker, Shepard & Stephens

[57] ABSTRACT

A method of producing photochromic multifocal spectacle lenses by fusion of a reading segment with a photochromic major lens portion. The reading segment and the main photochromic portion of the lens are fused together at a temperature which does not adversely affect the photochromic properties of the glass. In one embodiment of the invention, the parts are fused at a temperature in the tempering range but below the turbidity range of the photochromic glass, and are held at the fusing temperature for a sufficiently limited time so that turbidity does not occur. In another embodiment of the invention, the temperature of the glass is raised rather rapidly through the tempering range and through the turbidity range to a point above the turbidity range, and fusion occurs above this range, and then the glass is cooled rather rapidly down through the turbidity range and through the tempering range. It is found that if this is done sufficiently fast, the photochromic properties of the main piece of glass are not adversely affected even though the glass has passed through the temperature range which is normally considered to be the turbidity range. Various details of procedure are described.

21 Claims, 8 Drawing Figures

METHOD OF PRODUCING PHOTOCHROMIC MULTIFOCAL SPECTACLE LENSES

CROSS REFERENCE TO RELATED APPLICATION

This application is a continuation of application Ser. No. 355,865, filed Apr. 30, 1973 now abandoned.

BACKGROUND OF THE INVENTION

This invention relates to a method of producing photochromic multifocal spectacle lenses by fusion of a reading segment with a photochromic major lens.

Photochromic spectacle lenses have been commercially available for some years as single-focus lenses and have been well received. The success of such lenses has led to a desire for photochromic multifocal spectacle lenses, which desire, however, has not been satisfied to the full extent by the lenses of the prior art.

There are multifocal lenses which are gound from one piece and, of course, these can also be produced of photochromic material. These lenses in their optically better version have a step between reading and distance portions which makes them generally recognizable very distinctly as lenses for the presbyope and impedes cleaning of the spectacle lenses, and thus, is also unsanitary. In the optically less satisfactory version such spectacle lenses have a strong image jump affecting the function thereof. For the reasons stated above and since the manufacture of these spectacle lenses cannot be rationalized satisfactorily, the proportion of multifocal spectacle lenses ground from one piece available commercially is decreasing still further.

The prior art also includes so-called spectacle lenses of continuously varying power of photochromic material which are made of one piece and in which there is a continuous transition between reading and distance portions. Such lenses, however, are used relatively little for many reasons.

The primary commercial significance devolves on the fused multifocal spectacle lenses in which a segment of a material of greater refractive index is fused into a major lens. Hitherto, it has not been possible to make such lenses of photochromic material.

Also in the prior art, a flash glass of photochromic material has been polymerized on the convex surface of a normal, i.e. non-photochromic fused multifocal spectacle lens. Such glasses having good photochromic properties are substantially thicker and heavier than normal spectacle lenses. Therefore, generally, the thickness of the photochromic flashed glass is restricted in disfavor of the photochromic properties. Thus, a compromise is obtained in which thickness and weight are increased and the photochromic effect is reduced.

Photochromic spectacle lenses consist of a material which contains uniformly distributed minute separation areas of silver salts, for instance, silver halides. Under the influence of actinic radiation, a photolysis of these areas occurs and silver is separated out. This effects a reduction in the transmission of the glass. This photolysis is reversible, i.e. after the actinic radiation ceases, the separated silver re-assumes its original chemical composition and the transmission of the glass returns to its initial value. This regeneration of the areas is caused by long-wave radiation and heat influence.

The process of formation of the separation areas determining the photochromic properties of the glass are temperature-dependent in a high degree. When melting the glass, the silver salts added to the melt go into solution and are uniformly distributed in the melt. In the subsequent formation of the moldings, nuclei for the photochromic areas are formed in the glass. The moldings are subsequently tempered in a continuous-heating furnace in a temperature range of approximately from 550° to 650°C. The areas which determine the photochromic properties of the glass, develop fully, i.e. the molding after passing the tempering process has obtained its final photochromic properties which conform to those of the finished spectacle lenses.

In the working of the molding and the subsequent working of the spectacle lens made therefrom it is strictly noted that no temperatures occur which could affect the photochromic properties of the glass. In particular, special attention is paid to the fact of not heating the glass up to temperatures of approximately from 550° to 650°C.

Temperatures within or above the indicated temperature range are, however, necessary, if multifocal spectacle lenses are to be produced by fusion of two parts. According to unanimous opinion of those versed in the art, the manufacture of fused multifocal spectacle lenses of photochromic material is not possible, since the high temperatures to be applied lead to a destruction of the photochromic properties of the glass. Therefore, it has hitherto been considered impossible to produce photochromic fused multifocal spectacle lenses. Thus, the great demand for such glasses in the market could not be satisfied hitherto.

Exhaustive tests made in the laboratories of the applicant and based on new deliberations with respect to the theory of forming the areas determining the photochromic properties have presently shown that, contrary to the universal opinion in the prior art, it is possible nonetheless to produce fused multifocal spectacle lenses of photochromic material.

It is therefore an object of the present invention to provide a method of producing photochromic multifocal spectacle lenses by fusion of a reading segment with a photochromic major lens, in which the photochromic properties of the glass are not affected detrimentally.

DESCRIPTION OF THE PREFERRED EMBODIMENTS

Figure 1:
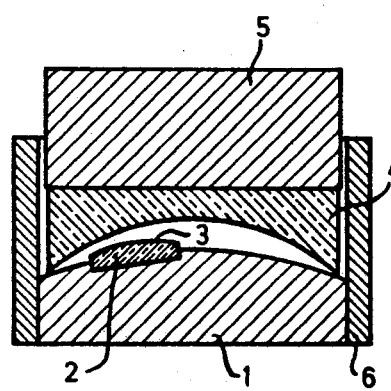
FIGS. 1 and 2 illustrate different stages of manufacture of a fused photochromic multifocal spectacle lens according to the first method of the present invention, in which a reading segment is used whose fusing temperature is higher than that of the distance portion glass.

The first method of the present invention is characterized in that the parts to be combined with each other as a whole are heated to a temperature in a range in which the separation areas determining the photochromic properties of the glass are formed, and that both parts are molten together and are subsequently cooled off so rapidly that the retention time of the glass in the said temperature range is smaller than the time sufficient to produce a turbidity in the glass.

A second method of solving the object according to the invention is characterized in that the major lens is rapidly heated to a temperature above the range of turbidity, that at the beginning of the subsequent cooling action the reading segment heated to a temperature below the range of turbidity is molten with the major lens whereby the cooling action takes place in such a manner, that the retention time of the fused glass in the said temperature range is smaller than the time sufficient to produce a turbidity in the glass.

In the first method according to the invention the parts to be combined are heated to a temperature which is in the tempering range, i.e. in the temperature range in which the photochromic areas are formed, and the parts are molten together at these temperatures. The tempering range approximately covers the temperature range of from 550° to 650°C.

This method is based on the novel knowledge or discovery that a photochromic glass can be heated to a temperature in the tempering range and can be maintained at this temperature for a longer period of time, in the order of 10 hours, without causing an elimination of the photochromic properties or a turbidity of the glass. In the tempering range the glass becomes viscous so that a fusion of distance portion and the reading segment prior to a turbidity of the glass is possible here.

It is important to heat the glass as a whole in order to avoid locally different photochromic properties, and to select temperature and melting duration such that the intended fusion occurs before a turbidity of the glass is caused due to separation of further glass components.

Expediently, with the described method the reading segment is made of a glass whose fusing temperature is higher than that of the distance portion material. Over the reading segment with finished $r_3$ radium the distance portion glass is placed which includes a well polished inner surface without a recess for the reading segment. The whole structure is then passed through a continuous-heating furnace. In the latter, a heating to a temperature in the upper part of the tempering range of the glass is effected. During this heating the distance portion glass is softened and sinks onto the segment, whereby an unobjectionable fusion is obtained. After controlled cooling, the produced fused blank is worked in the conventional manner. The continuous heating furnace is adjusted such that the retention time of the glass in the tempering range is smaller than the time sufficient to produce a turbidity of the glass. The retention time should not be longer than approximately 10 hours.

With the new method it is possible and in many cases also advantageous to produce the reading segment of a glass whose fusing temperature is lower than that of the distance portion material. A recess with the $r_3$ radius is then provided in the distance portion glass and polished. The reading segment with a well polished convex surface whose radius is slightly smaller than said $r_3$ radius is then placed over the recess in the distance portion glass and held by a ring of special alloy so that it does not contact the recess at any point. This structure is then passed through a continuous-heating furnace. In the latter, a heating to a temperature in the tempering range of the glass is effected. At the same time, the spacer melts and the softened reading segment sinks into the recess of the still inherently stable distance portion glass. Here too, after controlled cooling the produced fused blank is worked in the common manner. The continuous-heating furnace is adjusted so that the retention time of the glass in the tempering range is smaller than the time sufficient to produce a turbidity in the glass.

With both described methods it may be advantageous to carry out the fusion under pressure, in order to keep the melting duration and with it the retention time in the tempering range as short as possible.

With the second method according to the invention the photochromic distance portion lens is heated to a temperature above the range of turbidity and during the subsequent cooling action the less high-heated reading segment is pressed in.

The already mentioned tempering range of the photochromic glass is followed by the so-called range of turbidity which lies approximately between 650° and 900°C. In this range further glass components are separated so that yet a relatively temporary retention in the range of turbidity already causes irreversible turbidities in the glass. In the range above the range of turbidity the major lens melt remains relatively homogeneous. At these temperatures, the glass fuses quickly and become inherently instable.

The new method is based on the surprising discovery that a rapid heating of the photochromic glass beyond the range of turbidity does not cause any turbidities in the glass and that also the subsequent cooling from a temperature above the range of turbidity does not cause any turbidities provided the range of turbidity and the subsequent tempering range are passed through sufficiently rapidly. The distance portion glass heated beyond the turbidity range is fused so much that the less high-heated and therefore not yet fused reading segment can be pressed in rapidly under pressure, whereby an unobjectionable fusion is obtained.

The method is carried out expediently in such a way the distance portion glass is rapidly heated in a furnace to a temperature of about 900°C. At the same time, the reading segment with finished $r_3$ radius is heated to a temperature below the turbidity range, and expediently also below the tempering range. Thereafter, the distance portion glass is removed from the furnace and the reading segment is pressed in. The fused blank subsequently is expediently passed through a continuous-heating furnace for controlled cooling.

With the last described new method it is not necessary that the fusing temperatures of reading segment and distance portion are differing. Expediently, however, a reading segment will be selected whose material has a fusing temperature above the fusing temperature of the distance portion.

With both methods it is advantageous to re-heat the fused blank after its cooling to a temperature in whose range the photochromic areas are formed which are determinative for the photochromic properties of the glass, and subsequently to carry out a controlled cooling. By this measure it is obtained that for all glasses uniform conditions prevail with respect to the formation of the photochromic areas, so that the kinetics of the glasses are as uniform as possible.

The fact that with the method according to this invention the tempering of the photochromic glass is effected during or after the melting process makes it possible to use untempered material for the melting, i.e. material in which the photochromic properties are not yet fully established.

Since, when actinic radiation is applied to a photochromic glass, blackening of the glass is effected from the surface thereof, and since this blackening proceeds only slowly into the glass interior, it is possible also to produce the reading segment for the fused multifocal spectacle lenses of a non-photochromic material, wherein expediently the reading segment should be molten into the concave side of the distance portion glass.

Referring now to the drawings for further explanations of the methods of the present invention, FIG. 1 shows a support 1 onto which the reading segment 2 is placed in such position that its finished $r_3$ surface 3 faces the polished inner surface of the photochromic distance portion glass 4. This glass 4 is placed over the reading segment 2 and the whole structure in the illustrated embodiment is loaded with a weight 5 and surrounded by a metal ring 6. The weight 5 is selected so that a pressure of approximately 30 to 50 grams per square centimeter occurs.

The structure illustrated in FIG. 1 is introduced into a continuous-heating furnace and heated therein to a temperature within the tempering range. Thereby the material of the distance portion glass 4 is softened, while the reading segment 2 still remains hard. Accordingly, the distance portion glass under the influence of the weight 5 flows onto the reading segment 3, and an unobjectionable fusion is obtained. After fusion is effected, the fused blank passes through the cooling zone of the continuous-heating furnace, and after completion of passage through this furnace it has the configuration illustrated in FIG. 2. As can be recognized, the distance portion glass 4 has flowed onto the reading segment 2 and a glass has formed whose inner surface has the radius of the support 1. After removal of the fused blank from the support 1 first the inner surface is ground and polished and finally the outer surface is finished according to the desired prescription.

Figure 3:
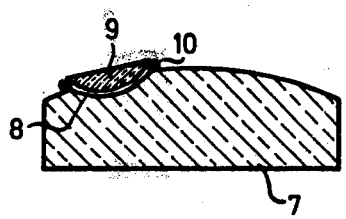
FIGS. 3 and 4 illustrate different stages of manufacture of a fused photochromic multifocal spectacle lens according to the first method, in which a reading segment is used whose fusing temperature is lower than that of the distance portion glass.

In FIG. 3, reference numeral 7 designates a distance portion glass into which a recess 8 with a finished $r_3$ radius is worked. Over this recess a reading segment 9 is placed whose surface facing the recess 8 has a slightly smaller radius than the recess. A ring 10 of a special alloy holds the reading segment 9 such that it does not contact the recess 8.

The structure illustrated in FIG. 3 is introduced into a continuous-heating furnace and is heated therein to a temperature in the tempering range. Thereby the ring 10 melts and the softened reading segment 9 sinks into the recess 8 of the still hard distance portion glass 7 and an unobjectionable fusion is obtained. The fused blank has the configuration shown in FIG. 4 and is passed through the cooling zone of the continuous-heating furnace. Thereafter, the conventional working of the fused blank follows.

Figure 4:
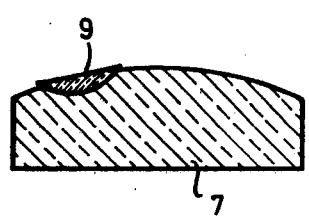

It is also possible to perform the method illustrated in FIGS. 3 and 4 in such a way that the sinking of the reading segment 9 is effected more rapidly by a suitably applied weight under pressure than under the influence of gravity alone.

Figure 2:
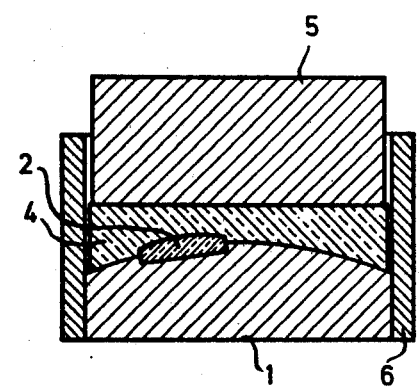

In FIGS. 1 and 2 melting of the reading segment into the concave surface of the distance portion glass, i.e., the so-called inside fusion, is illustrated. Of course, it is also possible according to this method to carry out an outside fusion, i.e., to melt the reading segment into the convex surface of the distance portion glass.

It is also possible to use the method illustrated in FIGS. 3 and 4 for the production of inside fusions.

Figure 5:
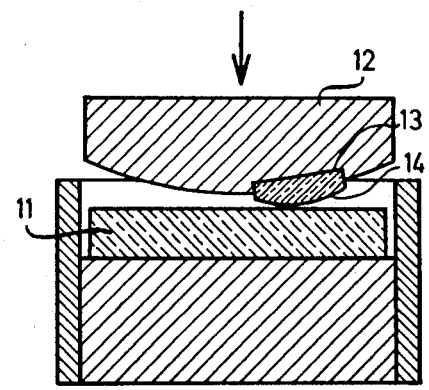
FIGS. 5 and 6 illustrate different stages of manufacture of a fused photochromic multifocal spectacle lens according to the second method of the present invention, in which the reading segment is molten (i.e., fused) into the concave side of the distance portion glass.

In FIG. 5, reference numeral 11 designates a distance portion glass which is designed as a plane parallel plate with a polished plane surface. This glass is heated to a temperature above the turbidity range. At the beginning of the cooling action, as is illustrated in FIG. 5, a reading segment 13 with finished $r_3$ surface 14 is pushed under pressure by means of a ram 12 into the still heated and therefore relatively easily deformable distance portion glass 11. The reading segment glass is heated to a temperature below the turbidity range, preferably also below the tempering range.

Figure 6:
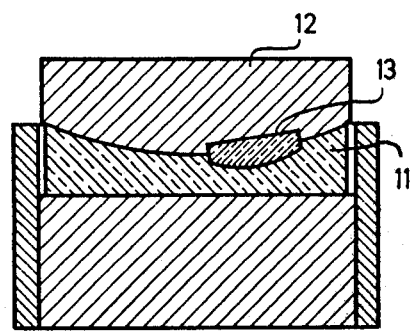

After completion of pressing-in of the reading segment 13, the glass illustrated in FIG. 6 is produced whose upper surface has now assumed the curvature of the facing surface of the ram 12. This glass is now rapidly cooled off and is expediently heated again in a continuous-heating furnace to a temperature within the tempering range and is thereafter cooled off again in a controlled manner. After effected tempering, finishing of the glass 11, 13 is effected in the conventional manner.

Figure 7:
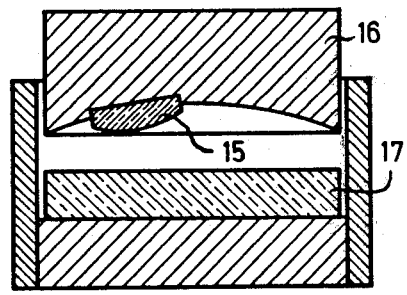
FIGS. 7 and 8 illustrate different stages of manufacture of a fused photochromic multifocal spectacle lens according to the second method, in which the reading segment is molten into the convex side of the distance portion glass.
Figure 8:
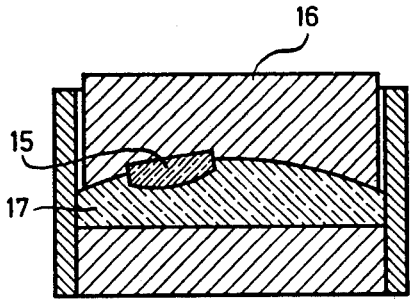

FIGS. 5 and 6 show an inside fusion. It is, however, also possible to use the described method for the production of outside fusions, as is shown in FIGS. 7 and 8. Herein, the ram 16 carrying the reading segment 15 is curved concavely. The melting action takes place accurately similarly to that shown with respect to FIGS. 5 and 6. In the fused condition (FIG. 8) a distance portion glass 17 has been produced into whose convex outer surface the reading segment 15 has been fused.

With both methods according to this invention, reading segments with straight or slightly curved upper edge can be used. It is, however, also possible to supplement the reading segments prior to fusion in the conventional manner and prior art manner by a supplementary part of round lenses.

The alloy used for the ring 10 must have a melting point in the temperature range in which the reading segment softens. In an exemplary embodiment of the invention it has been found that also aluminum may be used as material for the ring 10.

In the foregoing description, the word "molten" is used in the sense of "fused." The expression "turbidity" refers to the condition of lack of clarity or clearness of the glass which is sometimes called cloudiness.

The turbidity or cloudiness with which the present invention is concerned occurs in the body or thickness of the photochromic glass, rather than at the surface or interface of the photochromic glass with other glass.

What is claimed is:

1. The method of manufacturing a fused multifocal spectacle lens having a reading lens segment portion fused to a major lens portion having photochromic properties and formed from a glass containing silver salts and requiring heat treatment in a tempering range of temperature from 550° to 650°C. to improve its photochromic properties, the glass of said major lens portion having a tendency to develop turbidity when maintained at a temperature in said tempering range, the glass of one of said portions requiring heating to said tempering range in order to soften said one of them sufficiently for fusion of the two glasses to each other, said method comprising the steps of heating both of said lens portions, at least said major portion being heated to a temperature in said tempering range, bringing the two portions into fusion position relative to each other at a time not later than a time when said major portion is at a temperature in said tempering range, maintaining said major portion at a temperature in said tempering range only sufficiently long to improve the desired photochromic properties and to accomplish fusion of the two portions to each other, and then cooling the fused portions relatively rapidly to a temperature below said tempering range at such rate that the total time in said tempering range is not more than about 10 hours.

2. The method of claim 1, wherein the two fused portions, after being cooled to a temperature below said tempering range, are again heated to a temperature in said tempering range and then cooled at a controlled rate from said tempering range to approximately room temperature, to produce controllable uniformity of photochromic properties.

3. The method of manufacturing a fused multifocal spectacle lens having a reading lens segment portion fused to a major lens portion having photochromic properties and formed from a glass containing silver salts and requiring heat treatment in a tempering range of temperature from 550° to 650°C. to improve its photochromic properties, the glass of said major lens portion having a tendency to develop turbidity when maintained at a temperature in said tempering range and also to develop turbidity when maintained at a temperature in a turbidity range above said tempering range, the glass of said major portion requiring heating to said tempering range in order to condition it for fusion, said method comprising the steps of elevating the temperature of said major portion relatively rapidly through said tempering range and through said turbidity range to a temperature not less than approximately the upper limit of said turbidity range, heating said reading segment portion to an elevated temperature below said turbidity range, cooling said major portion from its elevated temperature, bringing the hot reading segment portion and the hot major portion into fusion position relative to each other while the major portion is being cooled and is still at least as hot as said tempering range and fusing the two portions to each other, and further cooling the two fused portions, the cooling of said major portion downwardly through said turbidity range and through said tempering range being accomplished relatively rapidly to control turbidity.

4. The method of claim 3, wherein said turbidity range is approximately 650° to 900°C.

5. The method of claim 3, wherein the two fused portions, after being cooled to a temperature below said tempering range, are again heated to a temperature in said tempering range and then cooled at a controlled rate from said tempering range to approximately room temperature, to produce controllable uniformity of photochromic properties 6. The method of manufacturing a fused multifocal spectacle lens comprising a major lens portion composed of a glass having photochromic porperties and at least one reading lens segment portion fused to the major lens portion, said method comprising the steps of:

a. forming a partially finished major lens portion of a glass containing silver salts potentially capable of being converted by heat to an improved photochromic condition;

b. forming a partially finished reading lens segment portion;

c. subjecting the partially finished major lens portion to a heat treatment at a temperature and for a time sufficient to at least initiate conversion of said silver salts to a photochromic condition;

d. combining the major lens portion and the reading lens segment portion in position for subsequent fusing;

e. heating the combined portions in the tempering range of softening of one of said portions while further developing and maintaining the photochromic porperties of the major lens portion, whereby the softened portion fuses to the other portion; and f. subsequently cooling the fused portions downwardly from fusing temperature at rapid rate to avoid production of turbidity in the spectacle lens and to avoid detrimental effect on any photochromic condition already produced.

7. The method defined in claim 6, wherein the fusing heat treatment of said step (e) is accomplished concurrently with and as a part of the photochromic conversion heat treatment of said step (c).

8. The method defined in claim 7, wherein said heating in step (e) is to the range of substantially 550° to 650°C.

9. The method defined in claim 8, wherein the total heating time of steps (c) and (e) plus the cooling time of step (f) in cooling down to room temperature does not exceed a total of approximately 10 hours.

10. The method defined in claim 6, wherein said first mentioned heat treating step (c) begins prior to said combining step (d).

11. The method defined in claim 6, wherein said major lens portion is rapidly heated during said step (c) to approximately 900°C. and partially cooled therefrom prior to combining said two portions in position for fusing.

12. The method defined in claim 11, wherein said reading lens segment portion is heated separately from said major lens portion to a temperature less than 900°C. and while so heated is combined with the major lens portion while the major lens portion is cooling down from said temperature of approximately 900°C.

13. The method of claim 12, wherein the combined and fused portions are cooled down from fusing temperature at a controlled cooling rate the control of which is accomplished by passing said fused portions through succesively cooler areas of a continuous heating furnace.

14. The method of claim 6, wherein said fused portions, after said cooling from fusing temperature in step (f), are reheated to a temperature in the range of formation of photochromic properties, and subsequently cooled to room temperature.

15. The method of claim 6, wherein said reading lens segment portion is formed from a glass which softens at a lower temperature than the softening temperature of said major lens portion.

16. The method of claim 6, wherein said major lens portion is formed from a glass which softens at a lower temperature than the softening temperature of said reading lens segment portion.

17. The method of claim 6, wherein said two portions are brought together during fusion by the force of gravity.

18. The method of claim 6, wherein said two portions are brought together during fusion by external pressure in addition to gravity.

19. The product of the process of claim 1.
20. The product of the process of claim 3.
21. The product of the process of claim 6.

* * * * *